UNITED STATES PATENT OFFICE.

FREDERICK WILLIAM HUBER, OF RIVERSIDE, CALIFORNIA.

PECTIC SUBSTANCE AND PROCESS OF MAKING THE SAME.

1,410,920.  Specification of Letters Patent.  Patented Mar. 28, 1922.

No Drawing.  Application filed November 8, 1920. Serial No. 422,538.

*To all whom it may concern:*

Be it known that I, FREDERICK WILLIAM HUBER, a citizen of the United States, residing at Riverside, in the county of Riverside and State of California, have invented a new and useful Pectic Substance and Process of Making the Same, of which the following is a specification.

This invention relates to a pectic substance adapted for use in making jellies, for example, fruit jellies, and the main object of the invention is to provide a material for this purpose which is in convenient condition for use and is extremely efficient as a gelatinizing agent.

Another object of my invention is to provide a pectic substance in substantially anhydrous condition and containing a peptizing agent, so as to be in convenient condition for immediate use for mixing with the sugar and flavoring materials, together with the requisite amount of water and coagulating agent, if desired. In making the pectic substance referred to, I may use any suitable fruits or vegetables. I have found that the waste lemon pulp constituting a by-product of the manufacture of citric acid is a suitable source of said substance and I will describe my process of making said substance using such waste lemon pulp, it being understood, however, that the process is applicable to other citrus or deciduous fruits, or to vegetables.

The process may be carried out as follows:

(1). The lemon pulp is ground as fine as possible by passing through a meat grinder;

(2) This finely ground pulp is now soaked for ten to thirty minutes with about three or four times its volume of water;

(3) The soaked pulp is then dewatered in any convenient manner. This removes practically all of the slime-like material which interferes with the subsequent operations;

(4) The dewatered pulp is now introduced into a dilute solution of caustic soda whose concentration lies between 0.2 and 0.4% NaOH (the volume of solution can to advantage be about two and a half times the weight of the pulp). The mass is gently stirred for about fifteen to thirty minutes at about 40° C. Extraction is equally good at any temperature up to 80° C; at 40° the extraction is more rapid than at atmospheric temperature. The solution contains the alkali extract of pectic substance. This solution is now removed from the pulp by straining or filtration and set aside;

(5) The remaining pulp is now again treated with an additional equal volume of dilute caustic soda (same concentration as above) and stirred as above for the same period of time at about the same temperature. The solution is then removed from the pulp and added to the solution set aside from the first extraction.

The pulp has now been exhausted of the greater portion of its pectic substance. It may be again treated with additional amounts of fresh leaching fluid and this then used to leach either a new batch of pulp or another batch of partially exhausted pulp in order to build up its concentration in pectic substance.

At this point attention is called to a very essential condition of the solution. If the pectic substance is precipitated from a solution too dilute a uniform thin gel forms on adding the precipitating reagent. This gel is unfilterable and cannot be washed free of impurities and reagent; but, on the other hand, if the solution is concentrated to near saturation then by adding the precipitant in a fine stream the pectic substance is precipitated in a globular and gelatinous form resembling very much in appearance soaked tapioca. This coagulum, or precipitate, is very easily filtered and washed and readily dried. The concentration can very conveniently be measured by its viscosity, and the addition is so adjusted that the concentration is sufficient to ensure that when the precipitant is introduced in a fine stream the pectic substance will form into globular, gelatinous bodies. A convenient way to ensure this is to use a solution which is nearly saturated with pectic substance but considerable departure from saturation may be allowed in some cases without preventing separation of the gel into a globular mass, and this condition of separating into a globular mass on addition of the precipitate in a fine stream may be used as a test as to sufficient saturation of the pectic substance in the solution. A little practice, however, will enable the operator to recognize the viscosity which corresponds to this condition of concentration and to estimate the concentration by measuring the viscosity of the solution;

(6) The combined solutions from steps #5 and #4 are now preferably clarified by sedimentation or centrifugation. The clarified solution is now ready to be precipitated. Working at atmospheric temperature, with gentle stirring, a fine stream of any mineral acid is slowly introduced until the solution is completely precipitated (which is, in the present example, apparent from the fading of the dark red color to a yellow) and the solution is faintly yet distinctly acid in reaction. I prefer to use, on account of its cheapness, sulfuric acid diluted to about one part of acid to four parts water;

(7) The tapioca-like coagulum is now freed of its solution by straining or filtering and washing. The washing is prolonged until the wash-water shows no trace of the acid used;

(8) The washed mass is now dried at a temperature not in excess of 70° C. The dried mass is then ground and constitutes the finished product. This product has the physical and chemical properties which have already been enumerated.

The pectic substance produced in this manner is, or may be substantially anhydrous and is in convenient condition for storage, shipment and use and constitutes a product which is marketable as such, requiring, however, the use of a peptizing or dispersing agent when it is used in making fruit, or other jellies, for example, this substantially anhydrous pectic substance produced as above described may be boiled with a one-half to one per cent solution of sodium or potassium citrate, or sodium, or potassium tartrate, or other alkali-metal salt of an organic acid (the amount of such salt being, for example, about equal by weight to the amount of pectic substance used) to produce a colloidal solution or dispersion to which the other constituents of the jelly are added, for example, about 65% of sugar and fruit flavoring, the resultant product, after boiling for a few minutes, setting to a stiff jelly upon cooling or standing from ten to twelve hours, or a rapid gelatinizing action can be effected by adding to the solution, in addition to the above constituents, from .2 to .5% of citric, or tartaric acid, at or near boiling temperature, the colloidal solution then setting to a stiff jelly in a period of from five to thirty minutes.

As a matter of convenience and economy, I prefer to provide the peptizing or dispersing agent in the substantially anhydrous pectic substance as it is manufactured for use and sale; for this purpose, the citric or tartaric acid, for example, in a finely ground condition, can be intimately mixed with the anhydrous pectic substance produced as above described, so that the resultant mixture contains not only the pectic substance proper but the dispersing agent therefor, and in order to produce a jelly it is only necessary to introduce this product containing a mixture of the pectic substance and the dispersing agent into water, together with the necessary amount of sugar and flavoring, if any, at or near boiling temperature, a suitable amount of coagulating or gelatinizing agent, such as citric or tartaric acid, being also added, if it is desired to make a rapid setting jelly.

The amount of peptizing agent added to the substantially anhydrous pectic substance may be in any suitable proportion, for example, equal portions by weight of dry pectic substance and sodium citrate or tartrate, may be ground together or intimately mixed in any suitable manner, the resulting mixture being a dry powder adapted for storage, use and sale in dry condition. A mixture so produced gives a satisfactory gel when 1% of the mixture, together with 65% of sugar, is added to water, and, if desired, the gelatinization of the resulting solution can be made almost instantaneous by the addition of 1% to ½% or organic acid.

It has long been known that pectin or pectic substance is soluble in alkalies. It has also been known that if such an alkaline solution be made acid with any acid that a precipitation takes place. This precipitate is insoluble in dilute mineral or organic acids and cold or hot water. I am not aware that this precipitate so obtained has ever been suggested as a pectic substance for making jellies; in fact, it has not been considered of value for the reason that it was irreversible, that is it cannot be dispersed to colloidal solution by simple treatment with water. It is this generally known fact of the physical properties of this gel that has probably discouraged investigators from attempting to make any commercial use of same. My discovery that this gel could be dispersed or peptized by means of suitable reagents, for example, an alkali-metal salt of an organic acid, enables me to utilize this product in the manner stated.

While I prefer to use as a peptizing or dispersing agent an alkali-metal salt of an organic acid, I have found that sodium or potassium phosphate can also be used, say in the proportions of one half to one per cent, in aqueous solution at or near boiling temperature, the pectic substance being dispersed or peptized thereby although not as effectively as when an alkali-metal salt of an organic acid is used, and I, therefore, prefer to use such alkali-metal salts of an organic acid, for example, potassium or sodium citrate or tartrate.

What I claim is:

1. A composition of matter comprising a pectic substance derived from fruit or vegetable matter by treatment of the latter with an alkaline solution, and precipitation with acid, and consisting of a gel irreversible to colloidal solution by treatment with water alone.

2. The composition of matter for use as a gelatinizing agent in making jellies and comprising a gel derived from fruit or vegetable material by treatment with an alkaline solution, and precipitation with acid, having the property of irreversibility to colloidal solution by treatment with water alone, said composition also including in intimate mixture with said gel a dispersing agent sufficient to effect dispersion of the said gel to colloidal solution on mixing the composition with water.

3. A composition of matter, as set forth in claim 2, in which said dispersing agent consists of an alkali-metal salt of an organic acid.

4. The process which consists in treating fruit or vegetable matter with an alkaline solution, treating the resultant solution with acid to precipitate a pectic substance, removing water from the pectic substance to bring it to substantially anhydrous condition, and intimately mixing with said pectic substance sufficient peptizing agent to disperse the said pectic substance to colloidal solution on mixture with water.

5. The process which consists in treating fruit or vegetable matter with water to remove soluble material and slimes, treating the residue with an alkaline solution, treating the resulting solution with acid to precipitate pectic substance, and drying said substance.

6. The process of making a gelatinizing substance which consists in treating fruit or vegetable matter with an alkaline solution to produce a solution of pectic substance, precipitating pectic substance from said solution by the addition of acid to the solution in a fine stream, the said solution of pectic substance being of sufficient concentration to cause a precipitate to be formed in separate globular masses, removing the precipitate from the solution, and drying the same.

In testimony whereof I have hereunto subscribed my name this 29th day of October, 1910.

FREDERICK WILLIAM HUBER.